United States Patent
Zhang et al.

(10) Patent No.: US 10,545,984 B2
(45) Date of Patent: Jan. 28, 2020

(54) ABSTRACT DEFAULT COLUMN TYPE IN TABLES

(71) Applicant: SAP SE, Walldorf (DE)

(72) Inventors: Sen Zhang, Xi'an (CN); Yinghua Ouyang, Xi'an (CN); Jian Wang, Xi'an (CN); Zhen Tian, Xi'an (DE)

(73) Assignee: SAP SE, Walldorf (DE)

( * ) Notice: Subject to any disclaimer, the term of this patent is extended or adjusted under 35 U.S.C. 154(b) by 168 days.

(21) Appl. No.: 15/602,373

(22) Filed: May 23, 2017

(65) Prior Publication Data

US 2018/0341689 A1  Nov. 29, 2018

(51) Int. Cl.
| G06F 17/30 | (2006.01) |
| G06F 16/25 | (2019.01) |
| G06F 16/22 | (2019.01) |
| G06F 16/21 | (2019.01) |
| G06F 16/23 | (2019.01) |

(52) U.S. Cl.
CPC .......... *G06F 16/258* (2019.01); *G06F 16/221* (2019.01); *G06F 16/214* (2019.01); *G06F 16/235* (2019.01); *G06F 16/2393* (2019.01)

(58) Field of Classification Search
CPC ......... G06F 17/30569; G06F 17/30306; G06F 17/30339; G06F 17/30365; G06F 16/258; G06F 16/21; G06F 16/289; G06F 16/211; G06F 16/221; G06F 16/214
USPC .... 707/640, 692, 693, 722, 756, 999.2, 792, 707/803
See application file for complete search history.

(56) References Cited

U.S. PATENT DOCUMENTS

| 6,076,090 | A * | 6/2000 | Burroughs | G06F 9/4493 707/792 |
| 7,672,960 | B2 * | 3/2010 | Anonsen | G06F 16/289 707/999.101 |
| 8,126,900 | B1 * | 2/2012 | Kostamaa | G06F 16/258 707/756 |
| 8,799,299 | B2 * | 8/2014 | Carroll | G06F 16/86 707/756 |
| 9,152,656 | B2 * | 10/2015 | McCormack | G06F 3/0482 |
| 9,154,372 | B2 * | 10/2015 | Richmond | G06F 17/245 |
| 2002/0161754 | A1 * | 10/2002 | Janssen | G06F 17/30569 |
| 2007/0038590 | A1 * | 2/2007 | Vijayan | G06F 17/30569 |
| 2008/0243916 | A1 * | 10/2008 | Liu | G06F 16/81 |
| 2009/0216809 | A1 * | 8/2009 | Horii | G06F 17/30448 |
| 2012/0096050 | A1 * | 4/2012 | Stork | G06F 17/30421 707/803 |

(Continued)

*Primary Examiner* — Dangelino N Gortayo
(74) *Attorney, Agent, or Firm* — Fish & Richardson P.C.

(57) ABSTRACT

Methods, systems, and computer-readable storage media for providing a table in a database system, the table including a column having a column data type set to an abstract data type, receiving a first data record to be added to the table, the first data record including a first data value to be included in the column, determining a first data type corresponding to a data type of the first data value, changing the column data type from the abstract data type to the first data type, receiving a second data record to be added to the table, the second data record including a second data value to be including in the column, determining a second data type corresponding to the data type of the second data value, and selectively changing the column data type to the second data type.

20 Claims, 7 Drawing Sheets

(56) References Cited

U.S. PATENT DOCUMENTS

2014/0279914 A1* 9/2014 Bester .............. G06F 17/30563
707/640
2015/0363494 A1* 12/2015 Norman ............. G06F 16/2423
707/769
2017/0139884 A1* 5/2017 Bendig ................ G06F 17/246

* cited by examiner

ABSTRACT DEFAULT COLUMN TYPE IN TABLES

BACKGROUND

Some data platforms have strict requirements that must be fulfilled to create a new table in a database and/or to migrate data between databases. For example, column data types must be explicitly provided before creating or migrating the table. Analyzing large datasets to identify data types is a common prerequisite for creating or migrating tables. Users often need to spend a lot of time to manually check databases to identify the appropriate data type for each column upon table creation or migration. In some cases, data types can be specific to particular platforms, so that migration can require conversion of data types from one format to a second format. The effort associated with data type identification and conversion can have a significant impact on the time necessary to complete data tables creation or migration, as well as underlying technical resources (e.g., processors, memory) used to perform such activities.

SUMMARY

Implementations of the present disclosure include computer-implemented methods for determining data types within a data table. In some implementations, actions include providing a table in a database system, the table including a column having a column data type set to an abstract data type, receiving a first data record to be added to the table, the first data record including a first data value to be included in the column, determining a first data type corresponding to a data type of the first data value, changing the column data type from the abstract data type to the first data type, receiving a second data record to be added to the table, the second data record including a second data value to be including in the column, determining a second data type corresponding to the data type of the second data value, and selectively changing the column data type to the second data type. Other implementations of this aspect include corresponding systems, apparatus, and computer programs, configured to perform the actions of the methods, encoded on computer storage devices.

These and other implementations can each optionally include one or more of the following features: the operation of receiving a user request to create the table in the database system and in response to receiving the user request, generating the table with the column data type set to the abstract data type; the table includes at least one column name corresponding to the at least one column; the operation of determining that the second data type is compatible with the first data; the operation of determining that the second data type is incompatible with the first data type; and the operation of converting at least one of the first data type and the second data type to a standard data type.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to importing tables with unknown column data types. More particularly, implementations of the present disclosure are directed to automatically identifying data types of columns of tables initiated with abstract default column types. Implementations can include actions of providing a table in a database system, the table including a column having a column data type set to an abstract data type, receiving a first data record to be added to the table, the first data record including a first data value to be included in the column, determining a first data type corresponding to a data type of the first data value, changing the column data type from the abstract data type to the first data type, receiving a second data record to be added to the table, the second data record including a second data value to be including in the column, determining a second data type corresponding to the data type of the second data value, and selectively changing the column data type to the second data type.

A challenge in importing tables is that some data platforms require identification of column data types before the data within the tables can be imported. Accordingly, creating or migrating large tables (e.g., with hundreds or thousands of columns) can require extensive periods of time to manually check databases to identify the appropriate data type for each column upon table creation or migration. As described in further detail herein, implementations of the present disclosure address this challenge. For example, in accordance with implementations, tables can be instantiated and updated by automatically determining a column data type and selectively changing a column data type based on the determined column data type.

Figure 1:
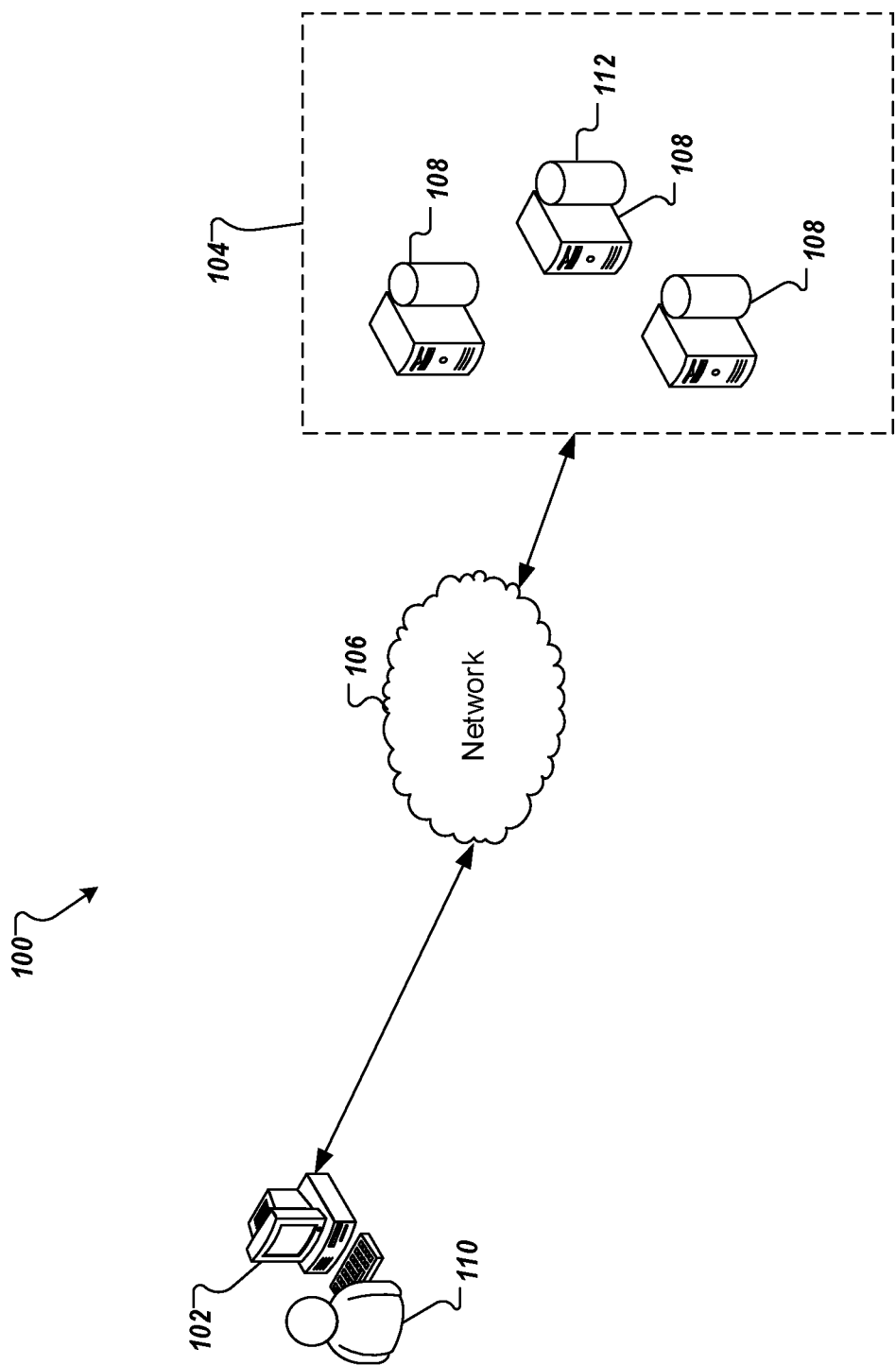
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104, and a network 106. The server system 104 includes one or more server devices 108, at least one of the one or more server devices 108 including a database 112. In the depicted example, a user 110 interacts with the client device 102. In an example context, the user 110 can include a user, who interacts with an application that is hosted by the server system 104. Even though, not illustrated in FIG. 1, a plurality of users can interact with the application that is hosted by the server system 104. For example, one or more users can interact with the application that is hosted by the server system 104 to select data to add to a single table or to multiple tables created and stored within the database 112.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106. In some implementations, the server system 104 can include the database 112 configured to provide a central point through which service-providers can manage and access data related to data migration services.

In accordance with implementations of the present disclosure, the server system 104 can host applications including data migration, data processing, and visualization of tables that can be displayed to the user 110 on the client device 102. In some examples, data records are received by the server device 108 of the server system 104 to be added to the table during a data migration and data update process. In some examples, the client device 102 indicates, which portion of the data record to be migrated and can execute a data migration and visualization software that retrieves data from the server system 104 and generates the data migration and visualization. In some examples, the server system 104 executes data migration software that retrieves data from the server system 104 and generates instructions that are provided to the client device 102 to display data associated to the migration (e.g., the data migration and visualization software is server-based and the client device 102 functions as a client computing device).

In some implementations, software can be stored in memory of each of the computing devices to provide instructions to a processor (not shown) to perform various functions in accordance with implementations of the present disclosure. For example, the client device 102 can store and execute software, such as an operating system and/or application programs. Implementations of the present disclosure can also include computer executable instructions, such as program modules executable by a computing device. In some examples, program modules can be defined as routines, programs, objects, components and/or data structures that perform particular tasks and/or that implement particular abstract data types.

Continuing, data migration tools (data migration software) can be provided to process and display data migrated to a particular database (e.g., database 112) that can be configured to require a definition of column data types to enable data migration. The database can be an in-memory database, data processing and application platform, which includes a database (DB) and an application service, where the database includes an engine and a driver. Using software component structures provided by SAP SE of Walldorf, Germany as a non-limiting example, a high-level component can be SAP HANA, which in turn includes HANA database (DB) and HANA extended application service (XS), where HANA DB includes an online analytical processing (OLAP) engine and a DB driver. The migrated data can be visualized using a particular visualization tool, such as SAP Lumira provided by SAP AG of Walldorf, Germany or any other visualization tool. In some examples, the visualized data can include pre-migration data and/or migrated data. In some examples, the data, that is to be migrated to the database and visualized on the client device 102, can be retrieved over the network 106 from the server system 104 or from external databases. In some examples, data is automatically retrieved (e.g. at particular intervals) or randomly retrieved from one or more external sources and stored in the database 112 of the server system 104. In some examples, the user 110 can generate instructions to retrieve the data for migration and analysis. In some examples, user 110 can include a private person, a service agency or a company.

In general, implementations of the present disclosure enable creation and modification of tables within databases. More particularly, implementations of the present disclosure enable creation of tables without specifying a column data type of data records to be added to the table. For example, an abstract default column type is automatically created for each column, and specific column data types can be determined automatically by processing data records to be inserted in the table. In some examples, the tables can include one or more columns. For example, the tables can be a data cube, which is provided as an array of data categorized into one or more dimensions. A data cube can be a representation of a multi-dimensional spreadsheet (e.g., a multi-dimensional dataset including a plurality of data tables). In some examples, a data cube includes a plurality of cells that are arranged in a structure including a plurality of rows and columns. The cells are populated with respective values (e.g., number, text) that can correspond to one or more data types (e.g., integer, string), which is associated to the column data type.

Implementations of the present disclosure will be discussed in further detail herein with reference to an example context. The example context includes business data (e.g., data reflecting operations of an enterprise). In the example context, an example data record can include a data object (DO) that includes data related to operations of an enterprise. It is contemplated, however, that implementations of the present disclosure are applicable in other contexts.

In accordance with implementations of the present disclosure, data records can be migrated to a database, by processing and adding the data records to tables generated with abstract column data types. In some implementations, the migration process includes processing the data for insertion into the table using a particular (e.g., standard) format and a particular (e.g., standard) data type. In some examples, a dimension of a table (e.g., a column) corresponds to a category of stored data. Example dimensions can include product, quantities, time, and location. In some examples, each dimension can have one or more sub-dimensions.

In some implementations, the data types are associated to the one or more sub-dimensions. For example, the product dimension can include sub-dimensions of category, and each sub-dimension of category can include sub-dimensions of line. As another example, the quantity can include sub-dimensions of quantities, and each sub-dimension of quantities can be expressed as a fraction, as a percent, or as a decimal. The quantity, including sub-dimensions of quantities, can be characterized by one or more data types, including a small integer, an integer, a real or a float. As another example, the time dimension can include sub-dimensions of year, each sub-dimension of year can include sub-dimensions of quarter, each sub-dimension of quarter can include sub-dimensions of month, each sub-dimension of month can include sub-dimensions of week, and so on. The time can be expressed numerical, in date format, or as a number of days, weeks, month or years or it can be expressed as text (e.g., name of month or day) or a combination of text and numbers. The time, including sub-dimensions of time, can be characterized by one or more data types, including a string, a char, a small integer, an integer, a real or a float. As another example, the location dimension can include sub-dimensions of country, each sub-dimension of country can include sub-dimensions of region (e.g., north, east, west, south, mid-west), each sub-dimension of region can include sub-dimensions of sub-region (e.g., state, province), and each sub-dimension of sub-region can include sub-dimensions of city. In some examples, a table can include a plurality (e.g., tens, hundreds, or thousands) of dimensions.

As noted above, data stored in the data record includes one or more columns, each column including one or more data that are associated to a particular data type. In some examples, each data is a fact (e.g., a numerical fact or a textual fact). In some examples, each data can be categorized into one or more dimensions. Example data can include specific product sales data (e.g., quantity sold, revenue, and/or profit margin, categorized by dimension). In short, measures can include any appropriate business data that can be manipulated according to business logic to assist or support the business enterprise.

In accordance with implementations of the present disclosure, new data can be added to a data record based on one or more rules. More particularly, implementations of the present disclosure provide user interfaces (UIs) that enable a user to identify data for migration. In some examples, the identified data can be processed to be added to the dataset of the data record and each column data type can be updated to correctly reflect the category of all the data within the corresponding column. An example of updated table through migration of data is described with reference to FIGS. 2A-2D.

FIGS. 2A-2D depict a portion of an example graphical user interface (GUI) 200 for displaying a table used for migrating data. In some implementations, the GUI 200 can be the interface displayed by the computing device 102, with which the user 110 is interacting, as described with reference to FIG. 1.

Figure 2A:
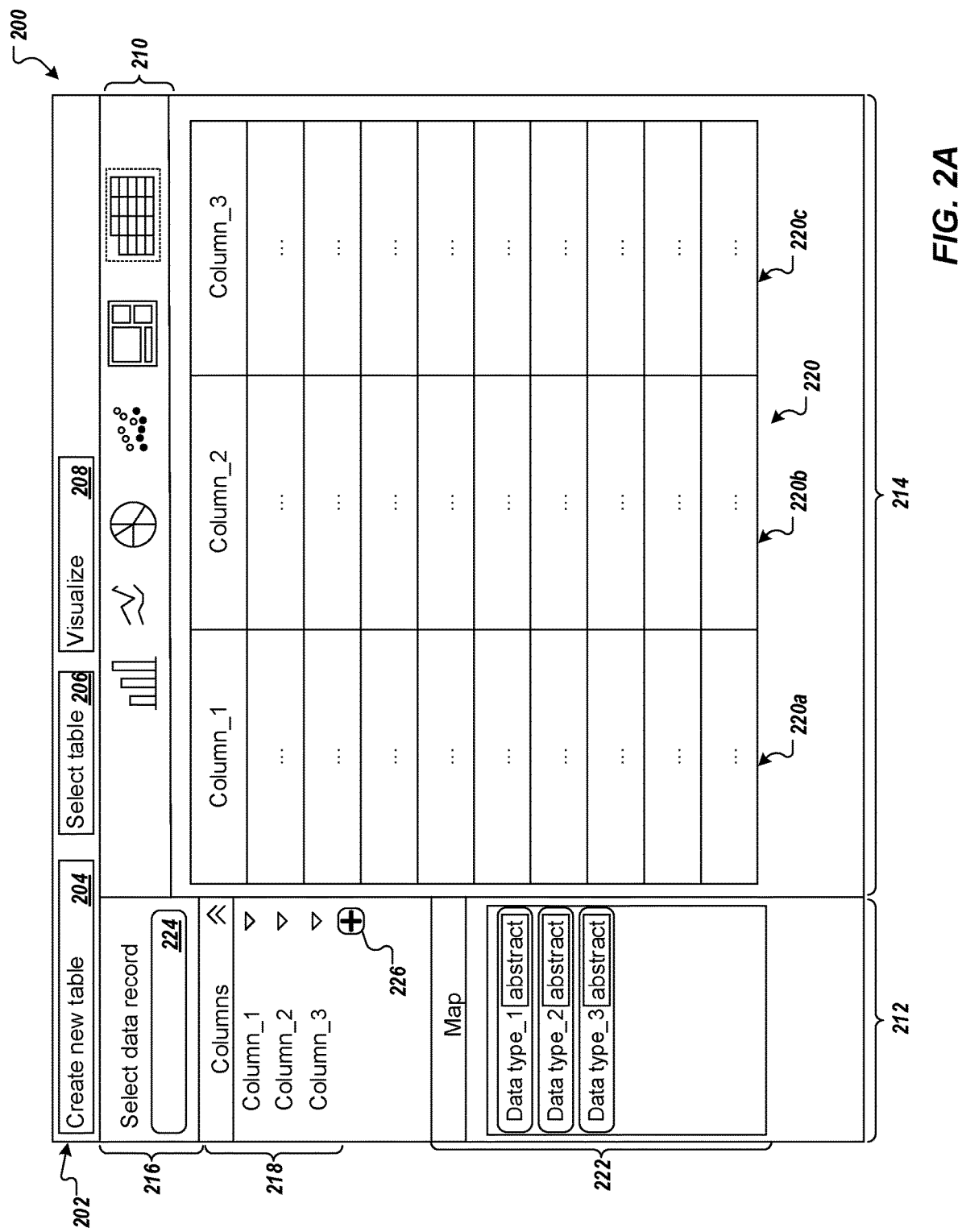
FIGS. 2A-2D depict an example graphical user interface in accordance with implementations of the present disclosure.
Figure 2B:
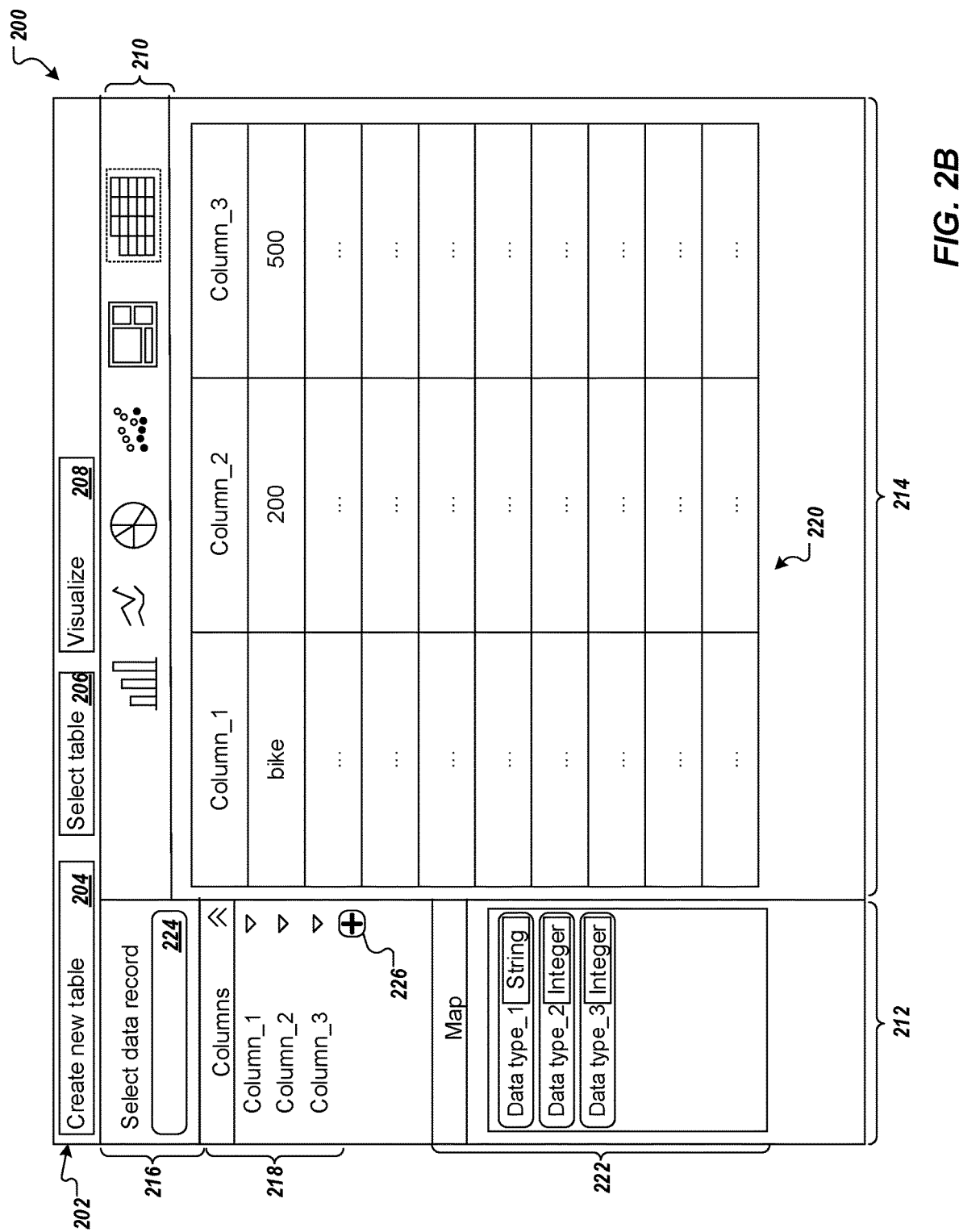
Figure 2C:
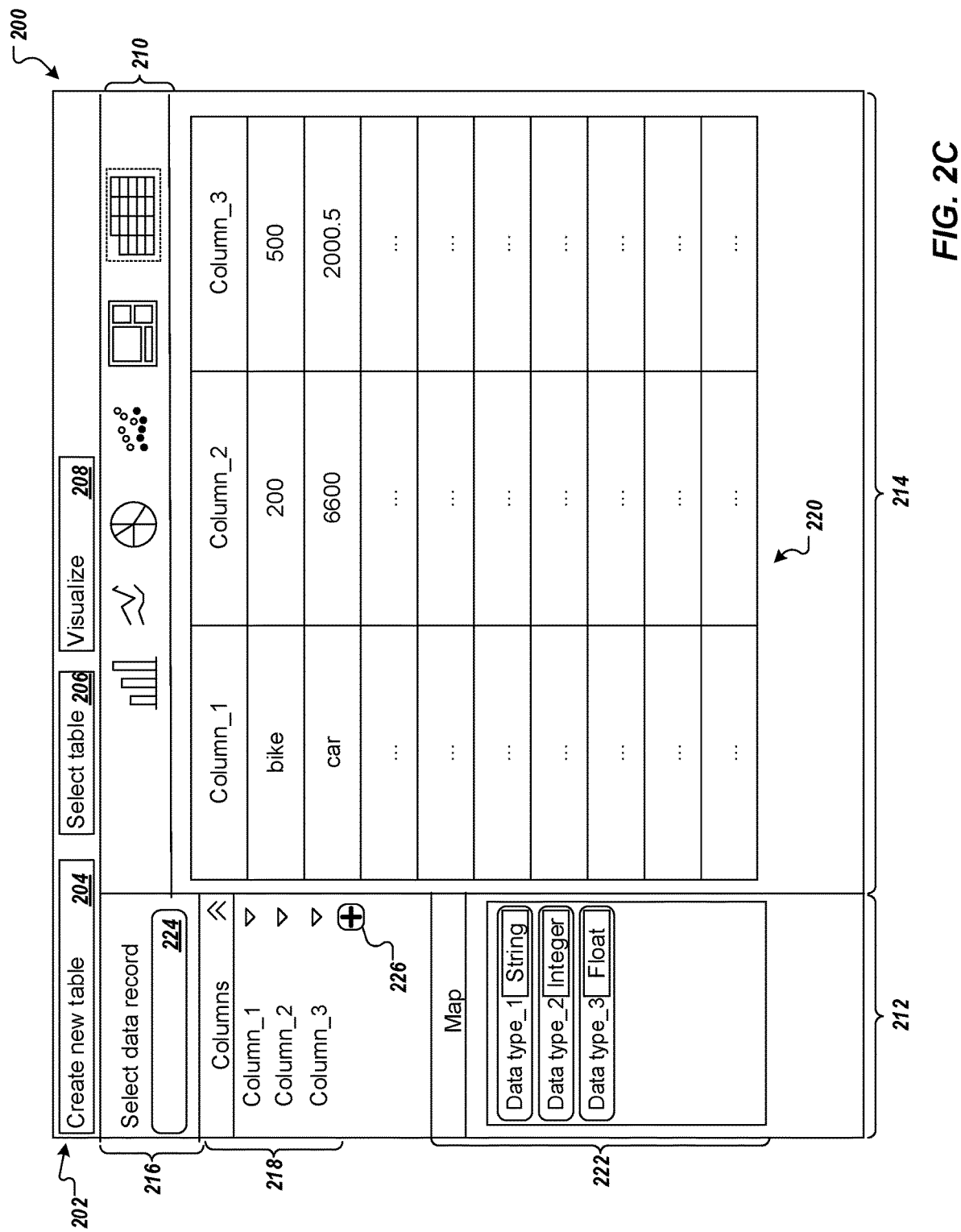
Figure 2D:
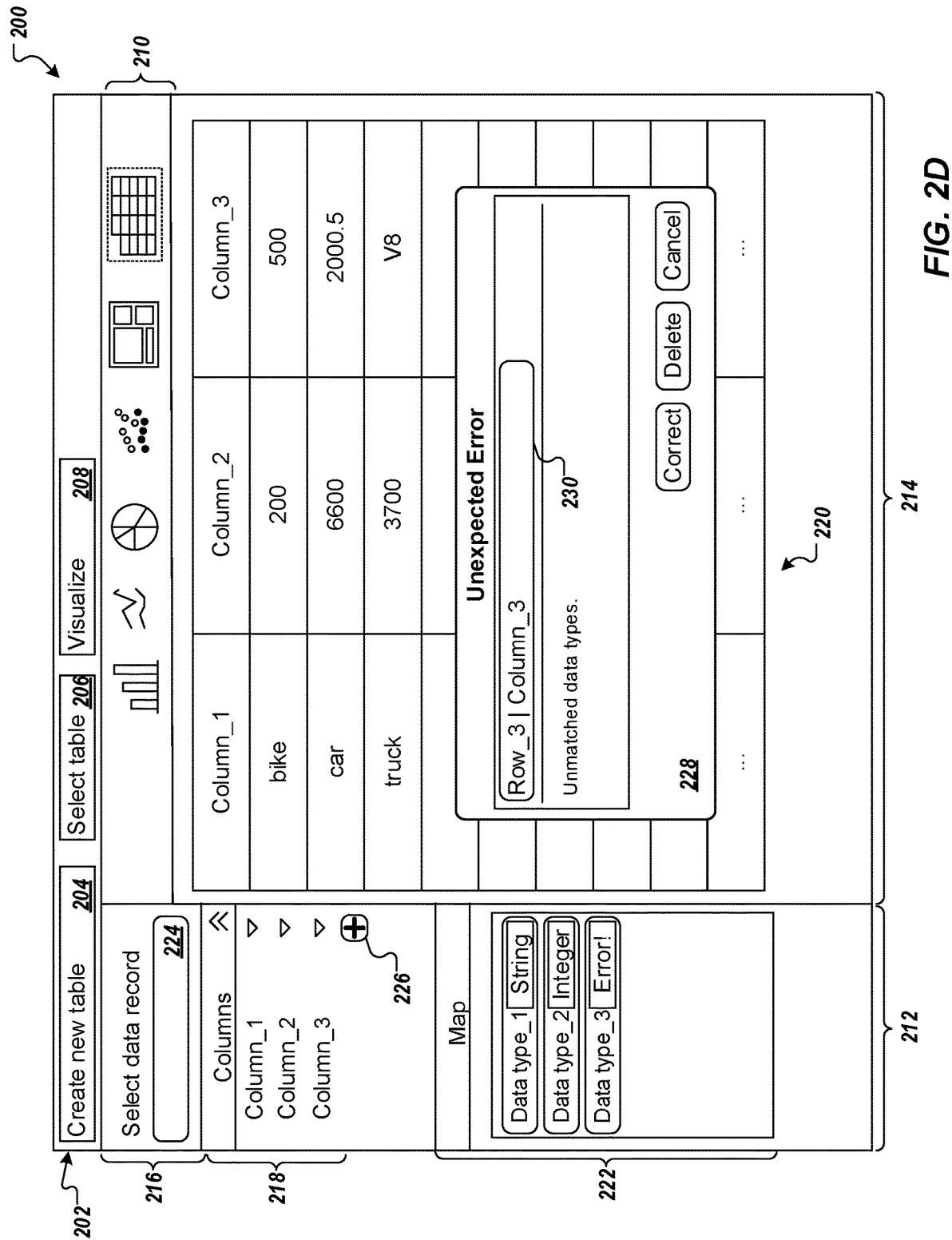

In the example of FIGS. 2A-2D, the GUI 200 includes a number of choices presented in a menu bar 202, such as create new table 204, select table 206 and visualize 208, a display menu 210, a visualization menu 212, an operations menu 212, and a display section 214. In the example illustrated in FIG. 2A, an empty table 220 with 3 columns 220a, 220b, 220c was created using the create new table menu 204 or the visualization menu 212. In other examples, as illustrated in FIGS. 2B-2D, a table including a data record can be selected using the choice table 206. The selection can cause the migration and visualization application to connect to the database over the network to enable a user to select an existent table stored in the database to be updated by adding a data record. The table 220 is displayed in the display section 214.

The operations menu 212 includes an option to select a data record 216, a columns menu 218, and a mapping menu 222, associated with the data to be displayed or currently displayed data. In some examples, the option to select data record 216 includes a search box 224 that enables searching of data records that can be used in data visualizations. The columns menu 218 lists columns of the data record that are available for data visualization. The columns menu 218 enables a user to add columns by selecting the addition option 226 and to rearrange the order of the columns.

The selection of a data type can enable a user to select and modify a column data type in the fact table 220, as discussed in further detail herein. For example, the data type is selected by clicking on and dragging the data type from the mapping menu 222 to a column 220a, 220b, 220c of the table 220.

In the example depicted in FIG. 2A, before data is migrated, the table 220 is illustrated as having empty columns that have abstract data types (e.g., data type_1 is an abstract data type, data type_2 is an abstract data type, and data type_3 is an abstract data type). In the example of FIG. 2B, the display section 214 includes the data visualization of a table 220 after the migration of a first row of data (e.g., {bike; 200; 500}). In some examples, the data included in the table is automatically processed to identify the data types of the first row for each column. In some examples, the determined column data types are displayed within the operations menu 212, such as in the mapping menu 222 (e.g., data type_1 is a string data type, data type_2 is an integer data type, and data type_3 is an integer data type). In the example of FIG. 2C, the display section 214 includes the data visualization of a table 220 after the migration of a second row of data (e.g., {car; 6600; 2000.5}). In some examples, the data included in the table is automatically processed to identify the data types of the second row relative to the first row for each column. In some examples, if one or more of the determined column data types for the newly added data are incompatible with or different from the previously determined data types, a new data type that can match all of the data types within the respective column is searched. If a data type that matches all of the data types within the respective column is found the column data type can be automatically updated. For example, the previously determined column data type of column 3 is integer. After adding, the second row to the table, the data type of the second row at column 3 is determined as being a float. The data type float matches the data of the first raw on column 3 and the data type of column 3 can be automatically updated to float. The updated column data types are displayed within the operations menu 212, such as in the mapping menu 222 (e.g., data type_1 is a string data type, data type_2 is an integer data type, and data type_3 is a float data type).

In the example of FIG. 2D, the display section 214 includes the data visualization of a table 220 after the migration of a third row of data (e.g., {truck; 3700; V8}). In some examples, the data included in the table is automatically processed to identify the data types of the third row relative to the previously identified data types (e.g., data types corresponding to the first and second rows) for each column. In some examples, if one or more of the determined column data types for the newly added data are incompatible with the previously determined data types, a new data type that matches all of the data types within the respective column is searched. If no data type that can match all of the data types within the respective column is found an alert interface 228 is generated. The alert interface 228 includes a text box 230, which indicates the cell with unmatched data types. In some implementations, the mapping menu 222 can indicate the cell with unmatched data types. For example, the mapping menu 222 can display updated or previously determined column data types and an error for the column with unmatched data types (e.g., data type_1 is a string data type, data type_2 is an integer data type, and data type_3 is an error). At least one of the alert interface 228 and the mapping menu 222 can enable a user to select a matching data type or to correct the data displayed in the column that triggered the alert.

Figure 3:
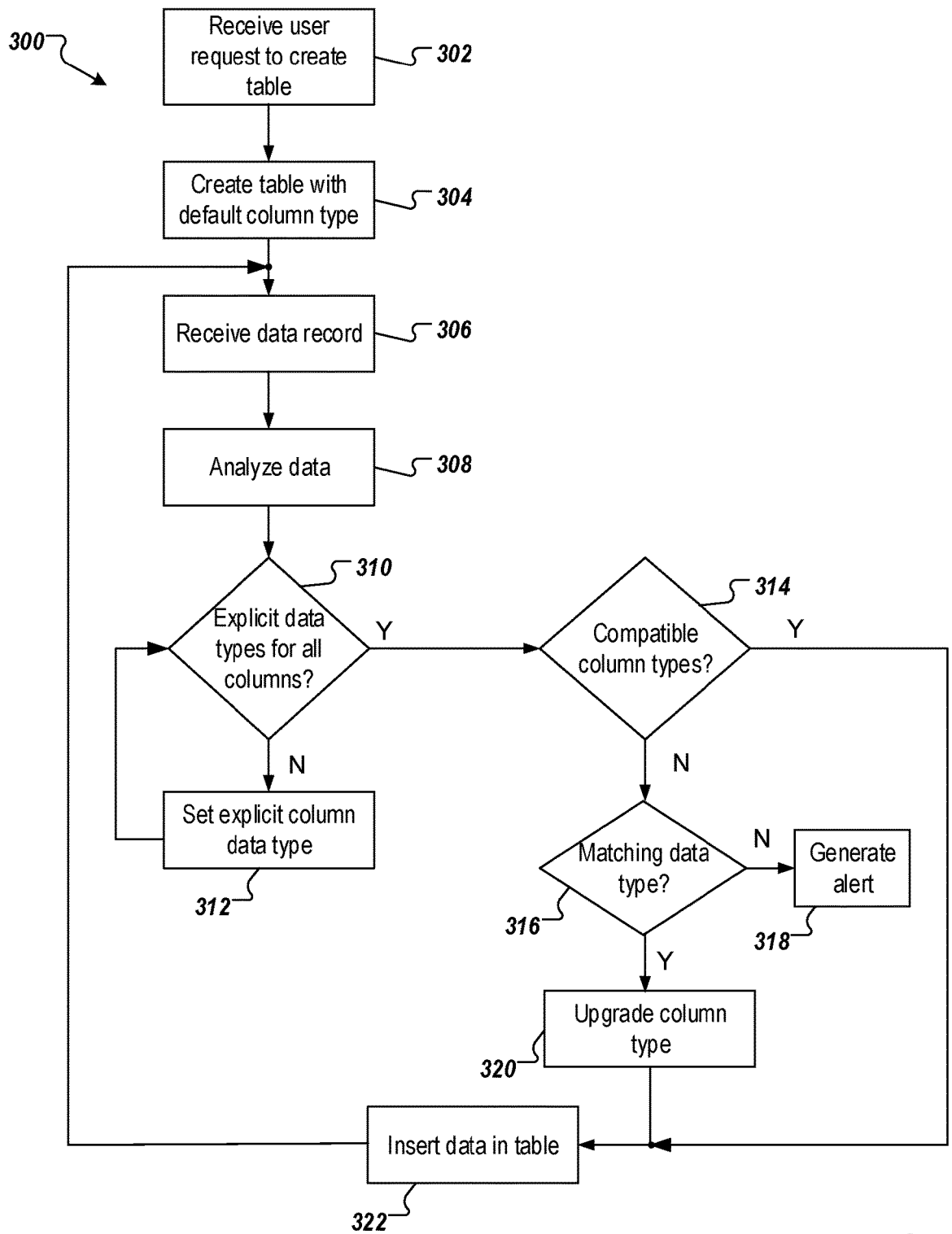
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices (e.g., the server system 104 of FIG. 1). The example process 300 can be used for automatically adding a data record to a table in a database.

A user request to create a table in a database is received (302). The user can be a registered user of the database or a new user of the database. The request can include a size of the data record, including a number of columns. In some examples, a column corresponds to a dimension of the data record and a column data type corresponds to a value of the data record. The user request can include a table name and column names, without explicitly defining any of the column data types. The column names can be processed to determine the number of columns. For example, the user request can be:

create table vehicle (name, amount, price);

In response to receiving the user request, a table can be created with the provided number of columns and default (e.g., abstract) column data types (304). Data is received and added to the table (306). In some implementations, the entire data is added to the table. In some implementations, the data record is fragmented into portions (e.g., based on rows) and it is added to the table portion by portion (e.g., row by row).

In response to adding the data record, the data record is analyzed one by one to determine a corresponding data type (308). Within the context example, analyzing the data values one by one per row can include:

Row 1:
    'bike': String
    200: integer
    500: integer
Row 2:
    'car': String
    66000: integer
    20000.5: float In some implementations, the data types can be mapped to standard data types specific to the database or the database management system storing the table. For example, the data types of HANA database management system, include: SMALLINT corresponding to a 16-bit signed integer (−32768–32767), INTEGER corresponding to a 32-bit signed integer, REAL corresponding to a single-precision 32-bit floating-point number in current database product and VARCHAR(100) for textual values. Within the context example, mapping the data values can include:

Row 1:
    'bike': String-> VARCHAR(100)
    200: integer-> SMALLINT
    500: integer-> SMALLINT
Row 2:
    'car': String-> VARCHAR(100)
    66000: integer-> INTEGER
    20000.5: float-> REAL In response to determining the data types of the added data, it is determined whether explicit data types are set for all columns (310). If one or more columns are determined as not having explicit data types (e.g., the table includes one or more columns with abstract default column data types), explicit column data types are set (312). Column data types can be set based on the data types of the first portion (e.g., first row) of the data added to the table. Within the context example, setting explicit column data types are can include:

Data type of column 1-> VARCHAR(100)
Data type of column 2-> SMALLINT
Data type of column 3-> SMALLINT In response to determining that the columns have explicit data types, it is determined whether the data types are compatible (314). Determining compatibility can include determining if the data types of an additional data record (e.g., row 2) per column is the same as the data types of the previous data record (e.g., row 1). In response to determining that one or more cells of the additional data record are not compatible with the corresponding column data type it is determined whether a matching data type can be set (316). Within the context example, the data type of row 2 for column 3 is REAL, which is different from the data type of column 3, which was previously set to SMALLINT and setting a matching column data type for column 3 can include are can include identifying that data type REAL can characterize the data value of row 1 at column 3.

In some implementations, determining whether a matching data type can be set can provide a plurality of data types that can match the data types of the existent and the additional data record. In response to determining a plurality of matching data types, the closest matching data type can be selected to upgrade the column data type. The closest matching data type can be identified based on the associated memory allocation, such that the data type of the plurality of matching data types with the lowest memory allocation requirement can be set as being the closest matching data type.

In response to determining that no matching data type can be found, an alert can be generated (318). In response to determining that a matching data type was found, the matching data type can be used to automatically upgrade the column data type (320). Within the context example, the data type of column 3 can be updated to REAL. In some implementations, a column can be upgraded a set number of times and if an upgrade exceeding the set number of times would be required, an alert is generated (318). The alert can include a request to manually set the column data type and/or to update (e.g., change or delete) the data value associated with the alert.

In response to upgrading the column data type or in response to determining that column data types are compatible for each column of the table, data is inserted in the table (322). In some implementations, the table with inserted data is displayed within a GUI (as illustrated in FIGS. 2A-2D). In some examples, the table with inserted data is displayed as a fact table including a plurality of columns with visible data types. In some examples, the data migration is visualized as an updated fact table that includes one or more columns corresponding to a dimension and a column data type for each column of the table. The process 300 can be repeated multiple times (e.g., each time a new portion of data is received for being added to a table), each time the data being automatically processed to update the column data types.

Implementations of the present disclosure provide one or more of the following example advantages. Implementations of the present disclosure enable users to easily and quickly create tables. Implementations do not require users to provide detailed column data types for different database products. Implementations of the present disclosure can be used to automatically migrate data between multiple database platforms (e.g., automatic extension of databases). Automatic migration is possible even between databases that use different data formats and/or different data types. The data migration can be automatically executed by one or more processors, requiring minimal manual input, leading to increased processing speed.

Figure 4:
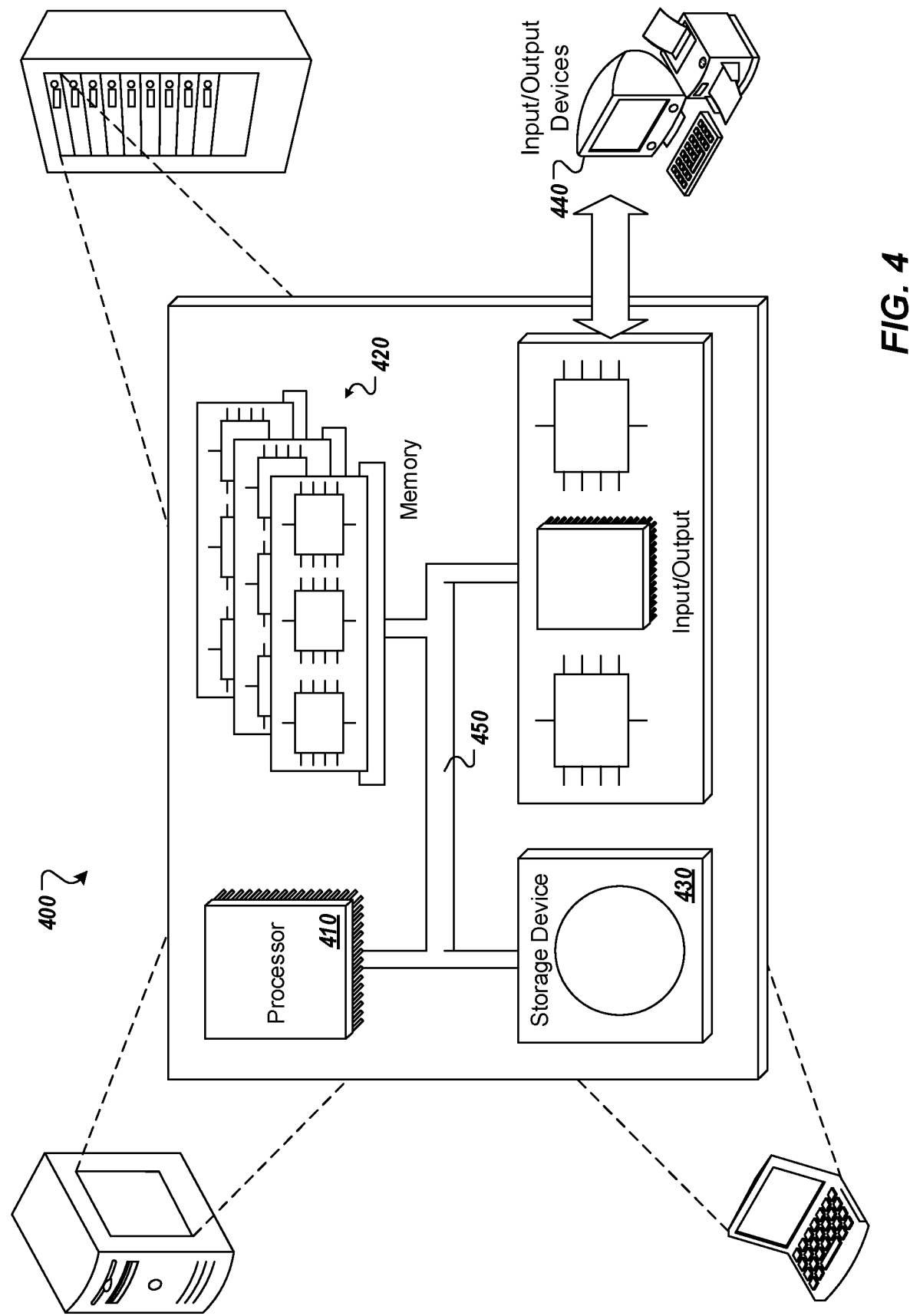
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for determining data types within a table, the method being executed by one or more processors and comprising:
   providing, by the one or more processors, the table in a database system, the table comprising at least one column having a column data type set to an abstract data type corresponding to an original default data format of the at least one column, the table being generated without predefining the column data type of data records to be added to the table, the database system being configured to require a definition of column data types different from the abstract data type to enable data migration;
   receiving, by the one or more processors, a first data record to be added to the table, the first data record comprising a first data value to be included in the at least one column;
   determining, by the one or more processors, a first data type, the first data type corresponding to a data type of the first data value;
   changing, by the one or more processors, the column data type from the abstract data type to the first data type enabling data migration;
   receiving, by the one or more processors, a second data record to be added to the table, the second data record comprising a second data value to be included in the at least one column;
   determining, by the one or more processors, a second data type, the second data type corresponding to the data type of the second data value; and
   selectively upgrading, by the one or more processors, based on a compatibility of the first data type with the second data type, the column data type to a new data type matching all data type within the at least one column.

2. The computer-implemented method of claim 1, further comprising receiving, by the one or more processors, a user request to create the table in the database system.

3. The computer-implemented method of claim 2, further comprising in response to receiving the user request, generating, by the one or more processors, the table with the column data type set to the abstract data type.

4. The computer-implemented method of claim 1, wherein the table comprises at least one column name corresponding to the at least one column.

5. The computer-implemented method of claim 1, further comprising determining that the second data type is compatible with the first data type.

6. The computer-implemented method of claim 1, further comprising determining that the second data type is incompatible with the first data type.

7. The computer-implemented method of claim 1, further comprising converting at least one of the first data type and the second data type to a standard data type.

8. A non-transitory computer-readable storage medium coupled to one or more processors and having instructions stored thereon which, when executed by the one or more processors, cause the one or more processors to perform operations for determining data types within a data table, the operations comprising:
   providing the table in a database system, the table comprising at least one column having a column data type set to an abstract data type corresponding to an original default data format of the at least one column, the table being generated without predefining the column data type of data records to be added to the table, the database system being configured to require a definition of column data types different from the abstract data type to enable data migration;
   receiving a first data record to be added to the table, the first data record comprising a first data value to be included in the at least one column;
   determining a first data type, the first data type corresponding to a data type of the first data value;
   changing the column data type from the abstract data type to the first data type enabling data migration;
   receiving a second data record to be added to the table, the second data record comprising a second data value to be included in the at least one column;
   determining a second data type, the second data type corresponding to the data type of the second data value; and
   selectively upgrading based on a compatibility of the first data type with the second data type, the column data type to a new data type matching all data type within the at least one column.

9. The non-transitory computer-readable storage medium of claim 8, wherein the operations further comprise receiving a user request to create the table in the database system.

10. The non-transitory computer-readable storage medium of claim 9, wherein the operations further comprise in response to receiving the user request, generating the table with the column data type set to the abstract data type.

11. The non-transitory computer-readable storage medium of claim 8, wherein the table comprises at least one column name corresponding to the at least one column.

12. The non-transitory computer-readable storage medium of claim 8, wherein the operations further comprise determining that the second data type is compatible with the first data type.

13. The non-transitory computer-readable storage medium of claim 8, wherein the operations further comprise determining that the second data type is incompatible with the first data type.

14. The non-transitory computer-readable storage medium of claim 8, wherein the operations further comprise converting at least one of the first data type and the second data type to a standard data type.

15. A system, comprising:
   a computing device; and
   a computer-readable storage device coupled to the computing device and having instructions stored thereon which, when executed by the computing device, cause the computing device to perform operations for determining data types within a data table, the operations comprising:
      providing the table in a database system, the table comprising at least one column having a column data type set to an abstract data type corresponding to an original default data format of the at least one column, the table being generated without predefining the column data type of data records to be added to the table, the database system being configured to require a definition of column data types different from the abstract data type to enable data migration;

receiving a first data record to be added to the table, the first data record comprising a first data value to be included in the at least one column;

determining a first data type, the first data type corresponding to a data type of the first data value;

changing the column data type from the abstract data type to the first data type enabling data migration;

receiving a second data record to be added to the table, the second data record comprising a second data value to be included in the at least one column;

determining a second data type, the second data type corresponding to the data type of the second data value; and selectively upgrading based on a compatibility of the first data type with the second data type, the column data type to a new data type matching all data type within the at least one column.

16. The system of claim 15, wherein the operations further comprise receiving a user request to create the table in the database system.

17. The system of claim 16, wherein the operations further comprise in response to receiving the user request, generating the table with the column data type set to the abstract data type.

18. The system of claim 15, wherein the table comprises at least one column name corresponding to the at least one column.

19. The system of claim 15, wherein the operations further comprise determining that the second data type is compatible with the first data type.

20. The system of claim 15, wherein the operations further comprise determining that the second data type is incompatible with the first data type.

* * * * *